United States Patent [19]

James et al.

[11] 4,420,251

[45] Dec. 13, 1983

[54] OPTICAL DEFORMATION SENSOR

[75] Inventors: Kenneth A. James, Corona del Mar; William H. Quick, La Habra Heights; Rudolf R. August, Laguna Beach; Virgil H. Strahan, Orange, all of Calif.

[73] Assignee: Rockwell International Corporation, El Segundo, Calif.

[21] Appl. No.: 334,998

[22] Filed: Dec. 28, 1981

Related U.S. Application Data

[63] Continuation of Ser. No. 146,929, May 5, 1980, abandoned.

[51] Int. Cl.³ .................... G01B 11/16; G01L 1/24
[52] U.S. Cl. ................................ 356/32; 73/800
[58] Field of Search .................... 356/32–35, 356/35.5, 351, 73.1; 250/225, 227; 350/96.1, 385, 96.15, 96.16; 73/655–657, 704, 800

[56] References Cited

FOREIGN PATENT DOCUMENTS 1544483 4/1979 United Kingdom ............... 356/73.1

OTHER PUBLICATIONS

Kelley et al., "Light Measurement Many Ways" Photonics Spectra, 3-1983, p. 52.
Brown, E. B. "Modern Optics", Reinhold Pub. Corp. 1965 pp. 219–225.
Sheem et al., "Acoustic Sensitivity of Single–Mode Optical Power Dividers" Optics Letters, 10-1979, pp. 322–324.
Sheem et al., "Polarization Effects on Single–Mode Optical Fiber Sensors", App. Phys. Lett. 12-1979, pp. 914–917.
Ogawa et al., "Multimode Fiber Coupler" App. Optics 7-1978 pp. 2077–2079.
Layton et al., "Optical Fiber Acoustic Sensor Utilizing Mode–Mode Interference" App. Optics 3-1979, pp. 666–670.
Kingsley, S. A., "Measurement of the Pressure Sensitivity of Single–Mode Optical–Fibre Phase Modulators", Microwaves, Optics & Acoustics, 11-1978, 204–208.

*Primary Examiner*—William H. Punter
*Attorney, Agent, or Firm*—H. Fredrick Hamann; Morland C. Fischer

[57] ABSTRACT

This invention relates to a lightweight and compact optical sensor that provides an indication of a deformation (e.g. fatigue, vibration, flex, torsion, bending, slippage) occurring at a monitored area. The sensor includes at least one light transmitting optical fiber and an optical detector that is responsive to the optical characteristics (e.g. amplitude, phase, polarization angle) of a supply of light signals being transmitted through the fiber. In the event that deformation occurs at the monitored region, the optical fiber undergoes a displacement which thereby causes a corresponding change in the optical characteristics of the light signals supplied to the detector. The optical characteristics of the light signals supplied to the detector relative to those of the light signals supplied to the optical fiber provide an accurate indication of the physical parameter.

6 Claims, 12 Drawing Figures

OPTICAL DEFORMATION SENSOR

This application is a continuation of application Ser. No. 146,929 filed May 5, 1980, and now abandoned.

BACKGROUND OF THE INVENTION

1. Field of the Invention

This invention relates to low cost, compact optical sensors, wherein the displacement of an optical fiber in response to a force applied thereto provides an accurate indication of a deformation occurring in a monitored region.

2. Description of the Prior Art

In many environments, it is desirable to be able to sense the occurrence of local deformation over wide material areas. Such deformations include, for example, fatigue, vibration, flexing, slippage, torsion, and bending. Applications in which deformation monitoring is especially desirable include: automobile, ship, and aircraft manufacturing; testing structural members; molding forms in the construction industry; building pressure vessels, fabricating composite materials, etc.

However, conventional deformation sensing typically requires the utilization of relatively cumbersome and expensive test equipment. More particularly, many wires and complex (mechanical-to-electrical) converters may be required to provide an accurate indication of deformation. Moreover, the size of such conventional equipment makes the deformation sensor generally unsuitable for permanent fixation to the area to be monitored. Accordingly, it becomes difficult to accurately monitor the test area for any long or continuous period of time. What is more, conventional sensing equipment may be undesirably susceptible to weathering or deterioration when exposed to certain environments for lengthy intervals.

Examples of optical apparatus that include an optical fiber and that may provide an indication of a physical parameter (e.g. a pressure or force signal) can be found in the following U.S. patents:

| U.S. Pat. No. | Issue Date |
|---|---|
| 2,922,873 | January 26, 1960 |
| 3,051,003 | August 28, 1962 |

SUMMARY OF THE INVENTION

Briefly, and in general terms, an optical deformation sensor is disclosed. The optical sensor includes at least one optical fiber, the displacement of which in response to an applied force provides an indication of a deformation occurring at a monitored region. In a first preferred embodiment of the invention, a pair of optical fibers are arranged in relatively close proximity to one another at the region to be monitored. Incident light signals are transmitted through at least a first of the pair of the fibers. Some of the optical energy of the transmitted light signals is coupled to the second of the pair of the fibers. In the event of the occurrence of a deformation and a corresponding displacement of the first fiber in response thereto, the amount of optical energy transmitted by the first optical fiber and coupled to the second optical fiber changes. An optical detector is interfaced with each of the first and second optical fibers to monitor the relative change in the optical characteristics of the output light signals therefrom, whereby to provide an indication of the deformation.

In a second preferred embodiment of the invention, a supply of polarized incident light signals is transmitted through an optical fiber. The incident light signals may be polarized by means of a first optical (e.g. diffraction) grating. A second optical (e.g. diffraction) grating is aligned with the first grating so that output light signals that have been transmitted through the optical fiber are also passed through the second grating. The first and second gratings may be positioned so as to be in an out of phase alignment with one another. In the event of the occurrence of a deformation and a corresponding displacement of the optical fiber in response thereto, the optical characteristics of the polarized incident optical signals are changed. An optical detector is interfaced with the optical fiber so as to receive the output light signals from the second grating. The optical characteristics of the output light signals relative to those of the incident light signals provides an indication of the deformation.

DESCRIPTION OF THE PREFERRED EMBODIMENT

Figure 1:
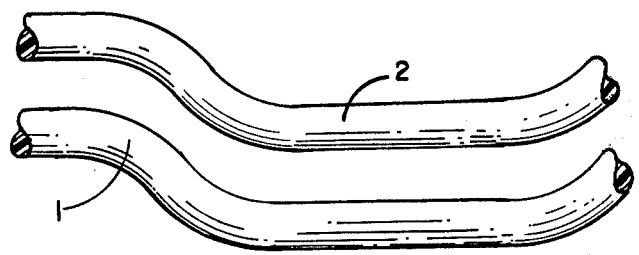
FIG. 1 illustrates a first preferred embodiment of an optical deformation sensor that forms the present invention.

A first preferred embodiment of a rugged, lightweight, and relatively inexpensive optical deformation sensor is shown in FIG. 1 of the drawings. The optical sensor comprises at least one pair of unclad, flexible fiber optic cores 1 and 2. Fiber optic cores 1 and 2 may be fabricated from any well known light conducting material, such as, for example, optical glass or plastic. Fiber cores 1 and 2 may be affixed (by means of adhesive, or the like) to the surface of a region that is to be monitored for deformation. It is to understood, however, that fiber cores 1 and 2 may also be embedded within the interior of any member to be monitored for deformation. Fiber cores 1 and 2 are positioned in relatively close proximity to one another. To enhance optical coupling therebetween and to increase the sensitivity of the optical sensor, fibers 1 and 2 are arranged to form curved, parallel paths (as shown). However, fibers 1 and 2 can also be arranged to include straight path segments.

Figure 2:
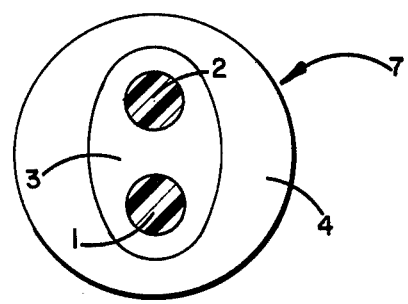
FIG. 2 shows a modification of the deformation sensor of FIG. 1.

A modification of the optical deformation sensors of FIG. 1 is illustrated in FIG. 2. When it is desirable to integrate fiber cores 1 and 2 into a compact sensor cable 7 that provides protection from the environment of the monitored region, fiber cores 1 and 2 may be covered with a suitable cladding material 3. Alternatively, fiber cores 1 and 2 may be surrounded by either a liquid or a vaccum. The cladding material 3 may then be surrounded by a flexible, non-transparent material 4, such as, for example, silicon rubber, or the like. It is also to be understood that several pairs of active and passive optical fibers 1 and 2 could be integrated within a single protective cable, similar to that designated by the reference numeral 7.

In operation, light signals are transmitted from the source 5 thereof, via active optical fiber 1, to optical detector 8. Prior to the occurrence of a deformation to a monitored region, a particular amount of light is initially coupled from the active optical fiber 1 to the passive optical fiber 2. In the event that a deformation (e.g. fatigue, vibration, flex, torsion, bending, slippage, and the like) occurs in the monitored region, at least one segment of active optical fiber 1 becomes increasingly bent relative to passive optical fiber 2. More particularly, any location (e.g. 10) that is deformed along the length of fiber 1 in response to a physical parameter is moved either closer to (as shown) or farther away from fiber 2. Incident light signals are split at the location 10 of the deformation, and, due to resulting bending losses, optical energy is transferred from active fiber 1 to the cladding material 3 (of FIG. 2). Moreover, the evanescent electromagnetic fields that occur within the cladding 3 become distorted between the fibers 1 and 2. Accordingly, an increase can be detected in the amount (i.e. the magnitude) of the light signals that are coupled from the active fiber 1 to the passive fiber 2 at any point 10 where fiber 1 becomes deformed and the bending losses therefrom correspondingly increase. The change in the relative magnitudes of the output light signals measured by optical detectors 6 and 8 provides an indication of the movement of active fiber 1 and, accordingly, the rate and magnitude of the deformation sensed at the monitored region. After continuous use, the light attenuation in the active fiber 1 increases as a result of the introduction of scattering centers, microcracks, etc., so that the accumulated deformation of a monitored region can also be sensed.

Figure 3:
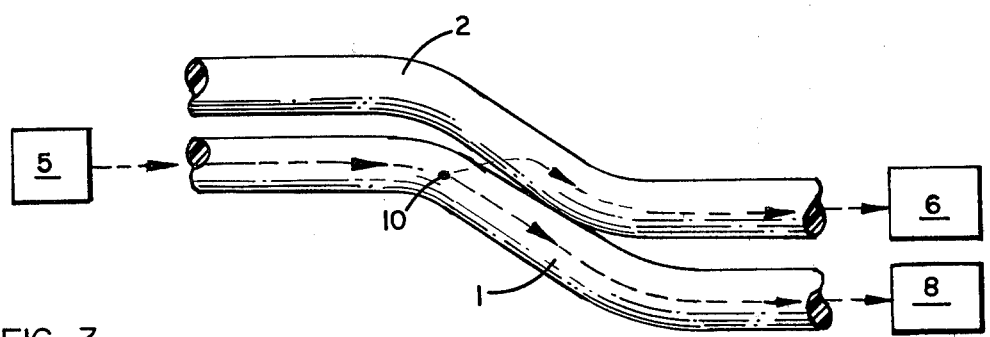
FIG. 3 illustrates the sensor of FIG. 1 being displaced in response to a deformation.

The technique by which fiber optic cores 1 and 2 sense deformation is explained when referring to FIG. 3 of the drawings. For the reason that will soon become apparent, fiber core 1 will hereinafter be referred to as the active optical fiber, and fiber core 2 will hereinafter be referred to as the passive optical fiber. A suitable source 5 of light is interfaced with a first end of the active optical fiber 1. For example, light source 5 may be a light emitting diode that supplies incident light signals to fiber 1. The second ends of each of the active and passive optical fibers 1 and 2 are interfaced with respective optical detectors 6 and 8. By way of example, each of optical detectors 6 and 8 may include a suitable semiconductor diode, such as a PIN diode, or the like. The optical detectors 6 and 8 are adapted to measure the intensity of the output light signals that are transmitted thereto from the second ends of active and passive optical fibers 1 and 2.

Sensor modifications to maximize sensitivity or the size of the region that can be accurately monitored by the instant deformation sensor include surrounding an active optical fiber 1 of relatively large diameter by several passive optical fibers 2 of smaller diameter. What is more, a suitably sized array of active and passive fibers may be arranged in different planes in order to concurrently monitor several likely deformation points over a region.

Figure 4:
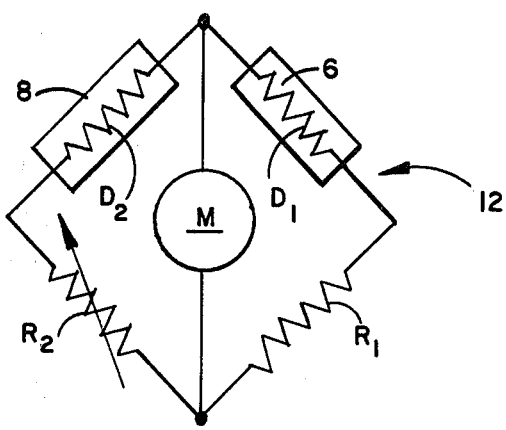
FIG. 4 shows one example of a means by which to provide an indication of a deformation that corresponds to the particular displacement of the sensor of FIG. 3.

FIG. 4 of the drawings shows a strain or deformation gauge 12 that can be used in conjunction with the optical deformation sensor of FIG. 3 to provide a signal that is representative or the deformation of a monitored region. Referring concurrently to FIGS. 3 and 4, the gauge 12 may comprise a bridge circuit having four resistive elements interconnected in a conventional fashion. One side of the bridge circuit includes the series connection of a photoresistor $D_1$ and a fixed resistor $R_1$. The other side of the bridge circuit includes the series connection of a photoresistor $D_2$ and a variable resistor $R_2$. Photoresistors $D_1$ and $D_2$ correspond to the resistances of the semiconductor diodes that form respective optical detectors 6 and 8. A suitable meter M is connected across the bridge circuit to indicate a change, such as in current, that occurs in either side of the bridge. Variable resistor $R_2$ can be used to balance the bridge circuit (i.e. or null meter M) to account for the initial optical coupling of light signals from active optical fiber 1 to passive optical fiber 2. As previously disclosed, a deformation occurring at a monitored region changes the relative magnitudes of the optical signals coupled between optical fibers 1 and 2, which magnitude changes are detected by optical detectors 6 and 8. Accordingly, the photoresistances of detector elements $D_1$ and $D_2$ change a corresponding amount, whereby to cause the bridge circuit of gauge 12 to become unbalanced. Hence, the output signal of meter M represents the magnitude (and the rate) of deformation that is sensed at a monitored region.

Figure 5:
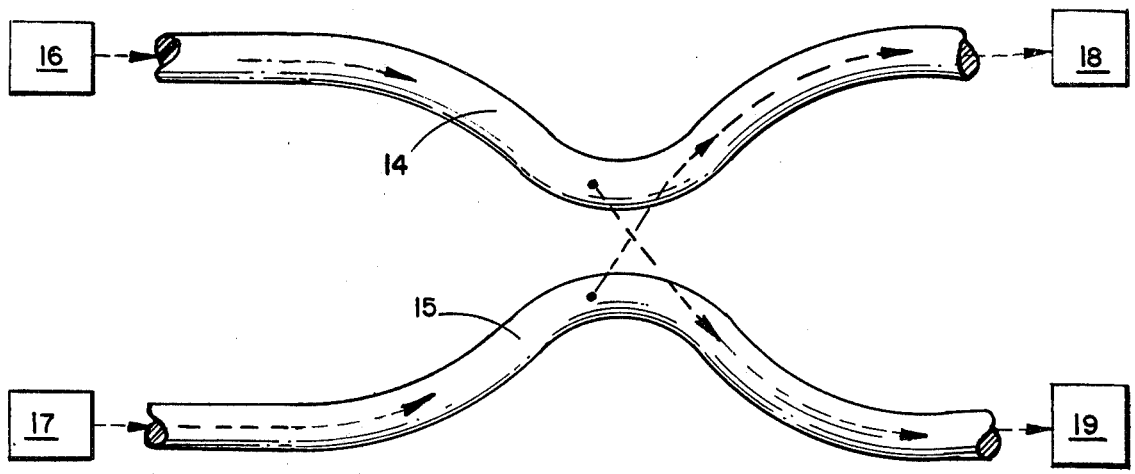
FIG. 5 represents a modification of the optical deformation sensor of FIG. 1 that is phase modulated.

A modification of the optical deformation sensors illustrated in FIGS. 1-4 is shown in FIG. 5 of the drawings. The embodiment shown in FIG. 5 represents a rugged and compact, phase modulated optical sensor which is characterized by a reduced dependency upon the changes in the relative intensities of output light signals that are sensed by an optical detector to indicate a deformation. That is, in the event that a deformation causes transmitted incident light signals to be coupled from an active to a passive optical fiber (as previously disclosed) and then coupled back to the active fiber at successive locations along the lengths of the fibers, the relative intensities of the output light signals may not provide a totally reliable indication of the deformation to be sensed. Therefore, in certain applications, a deformation sensor that is responsive to both the intensities and the phase of the detected output light signals is advantageously desirable.

More particularly, the deformation sensor of FIG. 5 includes at least one pair of flexible fiber optic cores 14 and 15 (that may be surrounded by a common cladding material, similar to that described when referring to FIG. 2). Fiber cores 14 and 15 may be either affixed to the surface or embedded within the interior of a region to be monitored for a deformation. To increase sensitivity, fiber cores 14 and 15 are typically arranged in relatively close proximity to one another and include generally curved segments. In the present embodiment of FIG. 5, each of the fiber cores 14 and 15 can be regarded as an active optical fiber. Suitable light sources 16 and 17 are interfaced with the respective first ends of optical fibers 14 and 15. As described in the embodiments above, the light sources 16 and 17 may be well known light emitting diodes that supply incident light signals to the first ends of fibers 14 and 15. The second ends of each of the optical fibers 14 and 15 are interfaced with respective conventional optical detectors 18 and 19, which detectors are adapted to measure both the amplitude and the phase of the output light signals transmitted thereto.

In operation, incident light signals are transmitted from sources 16 and 17, via optical fibers 14 and 15, to respective optical detectors 18 and 19. In the event that a deformation occurs in the monitored region, the transmitted incident light signals are split at the location of the deformation, and, due to the resulting bending losses, optical energy is coupled (i.e. transferred) between the fibers 14 and 15. By way of example, should optical fibers 14 and 15 experience similar bending losses, whereby the amount of light energy coupled from fiber 14 to fiber 15 approximates that coupled from fiber 15 to fiber 14, there will be little net change in the relative intensities of the output light signals measured by optical detectors 18 and 19. A deformation sensor of increased reliability is obtained by selecting light sources 16 and 17 which provide (e.g. sinusoidal) incident light signals that are out of phase with one another, for example, by 90°.

Figures 6, 7, 8, 9:
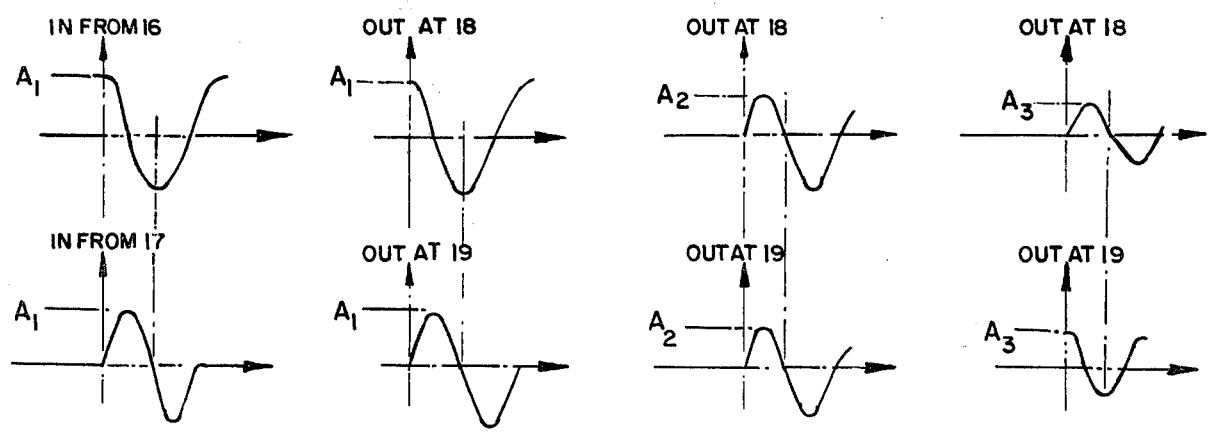
FIGS. 6-9 shows examples of the waveforms of the incident and output optical signals that are supplied to and transmitted from the phase modulated deformation sensor of FIG. 5.

Referring concurrently to FIGS. 5-9 of the drawings, FIG. 6 represents the corresponding waveforms of the incident light signals that are supplied to respective optical fibers 14 and 15 from light sources 16 and 17. For the convenience of illustration, the waveforms of the two incident light signals have similar maximum amplitudes, designated $A_1$ (but are out of phase from one another by +90°). During the time prior to the occurrence of a deformation to a monitored region when little optical cross-coupling results, the waveforms (i.e. the relative intensity and phase) of the output light signals detected by optical detectors 18 and 19 and represented by FIG. 7 of the drawings are substantially identical to those of the incident light signals (represented by FIG. 6). Therefore, prior to a deformation, the output light signals received by detectors 18 and 19 have a maximum amplitude $A_1$ and remain out of phase with one another by +90°.

However, in the event of the occurrence of a deformation, increased bending of optical fibers 14 and 15 results in a shift in phase and an attenuation of the output light signals received by optical detectors 18 and 19 relative to the incident light signals (of FIG. 6) supplied by light sources 16 and 17. FIG. 8 of the drawings represents the corresponding waveforms of the output light signals that are detected when approximately 50% of the incident light signal transmitted by optical fiber 14 is coupled to optical fiber 15, and vice versa. In the present example of FIG. 8, each of the output light signals are attenuated to a maximum amplitude designated $A_2$, and the phases thereof are shifted by 90° relative to one another, so that phase difference between the output light signals is reduced to approximately 0° (i.e. the waveforms of the output light signals are essentially in phase with one another.)

With the continued passage of time, optical fibers 14 and 15 may experience increased bending and corresponding bending losses. Accordingly, the waveforms of the output light signals received by optical detectors 18 and 19 are further shifted in phase and attenuated relative to the waveforms of the incident light signals (of FIG. 6) that are supplied by light sources 16 and 17.

FIG. 9 of the drawings represents the corresponding waveforms of the output light signals that are detected when approximately 100% of the incident light signal transmitted by optical fiber 14 is coupled to optical fiber 15, and vice versa. In the present example of FIG. 9, the intensities of each of the output light signals are attenuated to a maximum amplitude designated $A_3$, and the phases thereof are shifted by an additional 90° (from that of FIG. 8) relative to one another, so that the difference in phase between the output light signals is −90°.

In each of the examples of FIGS. 6-9, it was assumed, for convenience, that the maximum intensities of the incident light signals (FIG. 6) and the corresponding amount of optical energy cross-coupled between optical fibers 14 and 15 (FIGS. 7-9) were substantially identical to one another. Therefore, the difference in phase between the detected output light signals relative to that between the incident light signals is suitable to provide an accurate indication of a deformation sensed at a monitored region. However, it is also to be understood that the respective maximum intensities of the incident light signals and of the output light signals, as well as the corresponding amounts of energy cross-coupled between fibers 14 and 15, may vary. In this way, the difference between the intensities of the output light signals after the occurrence of a deformation relative to that detected prior to the deformation may also be utilized (according to the technique described when referring to FIGS. 1-4) to provide an indication of the deformation.

Figure 10:
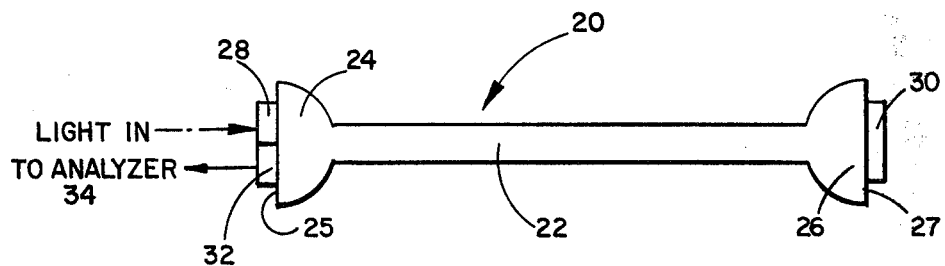
FIG. 10 illustrates a second preferred embodiment of an optical deformation sensor that forms the present invention.

A second preferred embodiment of an optical deformation sensor is shown in FIG. 10 of the drawings. Similar to the deformation sensors previously disclosed when referring to FIGS. 1-9, the deformation sensor 20 of FIG. 10 includes (a clad) optical fiber rod 22, the displacement of which in response to a deformation provides an accurate indication of the deformation occurring within a monitored region. Each end 24 and 26 of optical fiber rod 22 is suitably shaped into a hemisphere, or the like configuration. The hemispheres may be formed by fusing and polishing ends 24 and 26 into the desired shape. An optical polarizer 28, such as a diffraction grating, or the like, is applied to the flat face of one hemispherical fiber end 24. A suitable light source (not shown) is interfaced with polarizer 28 in order to supply incident light signals thereto. A reflecting surface 30, such as an aluminum, or the like, covered substrate, is applied to the flat face 27 of the opposite hemispherical fiber end 26. Reflecting surface 30 is adapted to reflect incident light signals that are supplied thereto from polarizer 28 via optical fiber rod 22. The inclusion of reflecting surface 30 is advantageous to maximize the sensitivity of sensor 20, inasmuch as light is conveyed twice (i.e. transmission and reflection) through fiber rod 22, so as to essentially double the number of output optical signals. An optical detecting and polarizing surface 32, such as a diffraction grating, is also applied to the flat face 25 of hemispherical end 24, adjacent polarizer 28. Defraction gratings 28 and 32 and reflecting substrate 30 may be applied to their respective flat faces 25 and 27 by means of conventional material deposition and/or photolithographic interferometric techniques. The disclosed hemispherical shape into which the ends 24 and 26 of fiber optic rod 22 are formed is advantageous for providing both a suitable flat glass substrate for receiving gratings 28 and 32 and a shape for maximizing the optical coupling of light signals therewith.

An optical analyzer 34 is interfaced with detecting surface 32, so as to receive for processing the output light signals that are transmitted thereto from reflecting surface 30 via optical rod 22. By way of example, analyzer 34 may be a holographic processor such as that described in detail in U.S. Pat. No. 4,296,994 issued Oct. 27, 1981, and incorporated herein by reference.

Figure 11:
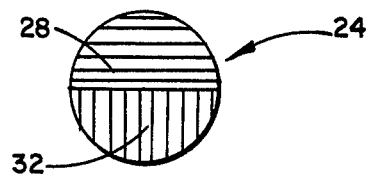
FIG. 11 shows a modification of the deformation sensor of FIG. 10.

In operation, and in a reflecting mode of operation, incident light signals are supplied to polarizer 28. Polarized incident light signals are transmitted via optical fiber rod 22, to reflecting surface 30, and then to detecting surface 32. The spacings between the gratings which form the polarizing and detecting surfaces 28 and 32 may be chosen to match the wavelength of a monochromatic light source, and the shape and periodicity of the opaque regions of the surfaces 28 and 32 may be chosen to provide particularly recognizable grating patterns or characteristics in a manner that is well known to those skilled in the art. Or, as is more particularly shown in FIG. 11 of the drawings, the grating alignment of the polarizing and detecting surfaces 28 and 32 at the hemispherical fiber end 24 can be mechanically positioned, so as to be out of phase with one another. By way of example, the grating patterns illustrated in FIG. 11 are 90° out of phase from one another. The aforementioned positioning is advantageous, because the ratio of the intensities of the output light signals prior to and after a deformation can provide an indication of the deformation. Therefore, an optical deformation sensor such as that illustrated in FIG. 11 is relatively insensitive to the effects of attenuation of the light signals that are transmitted by fiber optic rod 22.

Accordingly, prior to the occurrence of a deformation, the output light signals that are provided to analyzer 34 via detecting surface 32 have an initial set of optical characteristics. In the event that a region to be monitored experiences a deformation, such as one of those deformations mentioned above, optical rod 22 will undergo a twisting or a bending in response to the magnitude and direction of the deformation. Accordingly, the initial optical characteristics of the polarized light transmitted via fiber rod 22 may be modified during transmission and reflection from polarizer 28 to detecting surface 32. More particularly, the relative change in intensity at detecting surface 32, the shift in polarization angle, and the extent of depolarization of the output light signals can be compared by analyzer 34 with the corresponding initial optical characteristics sensed prior to deformation, so that an accurate indication of the magnitude and rate of deformation at a monitored region can be provided.

By way of example, if fiber optic rod 22 is subjected to a temperature change, a corresponding dilation of the grating spacings will alter the optical characteristics of the transmitted (or reflected) light signal. If rod 22 is twisted in response to the application of a torque, the relative angles of orientation of the diffraction gratings 28 and 32 is changed. What is more, fatiguing of the fiber rod 22 caused by repeated flexing will affect the intensity and polarization of the output light signals.

Figure 12:
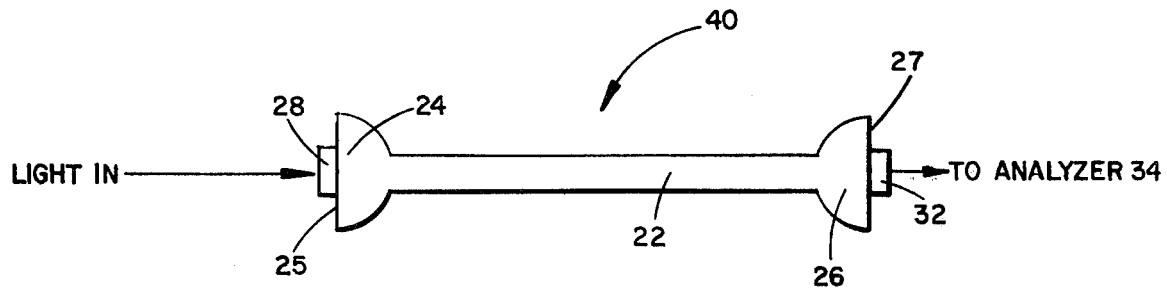
FIG. 12 shows another modification of the deformation sensor of FIG. 10.

An alternate embodiment of the optical deformation sensor of FIG. 10 is shown in FIG. 12. The deformation sensor 40 of FIG. 12 is similar to that illustrated in FIG. 10, except that a reflecting surface is omitted from the present embodiment. More particularly, an optical polarizer 28 is applied to the flat face 25 of hemispherical fiber end 24, and a detecting surface 32 is applied to the flat face 27 of hemispherical fiber end 26. Rather than reflect incident light signals back to the hemispherical end 24 (as in the deformation sensor 20 of FIG. 10), in a transmitting mode of operation, polarized incident light signals are, otherwise, transmitted via fiber optic rod 22 directly through detecting surface 32 to analyzer 34. Therefore, reflection and absorption losses (at the cladding surrounding fiber rod 22) are minimized. Accordingly, the relative changes of the optical characteristics of the output light signals can be externally compared and processed by analyzer 34, so that an accurate indication can be provided of the various physical parameters and/or mechanical stresses that are imposed on the fiber rod 22 at the region to be monitored.

Additional sensor modifications include the following. It is to be understood that if a polarized source of incident light signals is utilized, optical polarizer surface 28 may be eliminated from the input end 24 of the optical rod 22. Also, the flat faces 25 and 27 of the hemispherical fiber ends 24 and 26 may be canted at any suitable angle with respect to the longitudinal axis of the rod 22.

It will be apparent that while the preferred embodiments of the invention have been shown and described, various modifications and changes may be made without departing from the true spirit and scope of the invention. Having thus set forth the preferred embodiments of the invention, what we claim is:

1. An optical sensor to provide an indication of a physical parameter, said optical sensor comprising:
    source means for providing a supply of incident light signals,
    first optical means to polarize said incident light signals,
    second optical means arranged so as to selectively transmit polarized light signals that are supplied thereto,
    at least one light transmitting optical fiber aligned at a first end thereof with each of said first and second optical means for receiving polarized incident light signals from said first optical means,
    light reflecting means aligned with the second end of said optical fiber to thereby reflect polarized light signals that are transmitted thereto via said optical fiber back through said optical fiber and to said second optical means, and
    optical detector means aligned to receive polarized output light signals that are selectively transmitted from said optical fiber through said second optical means, said detector means being responsive to the optical characteristics of the output light signals,
    said optical fiber undergoing a corresponding deformation in response to a physical parameter, whereby to alter the optical characteristics of the light signals being transmitted therethrough,
    the optical characteristics of the output light signals that are transmitted to said optical detector means through said second optical means relative to the optical characteristics of the incident light signals supplied to said optical fiber from said first optical means providing an indication of the physical parameter.

2. The optical sensor recited in claim 1, wherein the first end of said optical fiber comprises a relatively enlarged terminal to increase the optical coupling of light signals into and out of said fiber,
    said enlarged terminal having at least one flat face, and at least one of said first and second optical means positioned on the flat face of said terminal.

3. The optical sensor recited in claim 2, wherein the second end of said optical fiber comprises a relatively enlarged terminal having at least one flat face, said light reflecting means positioned on the flat face of said last-mentioned terminal.

4. The optical sensor recited in claim 1, wherein said first and second optical means include respective grating patterns that are rotated out of alignment relative to one another.

5. The optical sensor recited in claim 4, wherein one of said first or second optical grating patterns is rotated with respect to the other, so that said grating patterns are 90 degrees out of alignment with one another.

6. The optical sensor recited in claim 1, wherein each of said first and second optical means comprises a diffraction grating.

* * * * *